3,513,185
PREPARATION OF BENZYL CYANO-ACETALS
Ronald Morton Cresswell, Scarsdale, and John William
 Mentha, Hartsdale, N.Y., assignors to Burroughs
 Wellcome & Co. (U.S.A.), Inc., Tuckahoe, N.Y., a
 corporation of New York
No Drawing. Filed Oct. 18, 1966, Ser. No. 587,392
Claims priority, application Great Britain, Oct. 28, 1965,
 45,657/65
Int. Cl. C07c *121/66*
U.S. Cl. 260—465                 8 Claims

ABSTRACT OF THE DISCLOSURE

A method of preparing a compound of Formula a

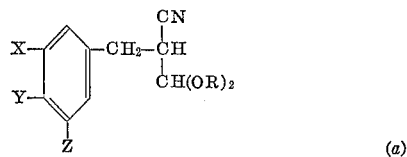
(a)

where X, Y and Z are lower alkoxy, halogen or hydrogen and where R is lower alkyl having 1 to 4 carbon atoms which comprises the steps of
 (1) mixing an aldehyde of the Formula b

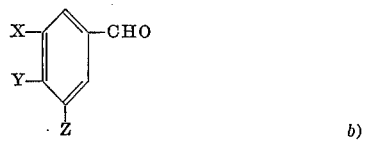
b)

with a compound of Formula c

(c)

in the presence of a lower alkanol and an alkali base to form a compound of the Formula d

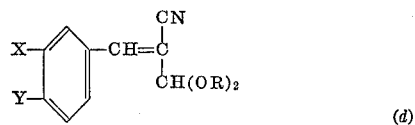
(d)

(2) treating the compound of Formula d with hydrogen in a lower alcohol solvent in the presence of a palladized charcoal catalyst or a platinized charcoal catalyst to form a compound of Formula a. The compound of Formula a is an intermediate in the preparation of 2,4-diamino-5-benzylpyrimidines which have anti-bacterial properties.

---

This invention relates to novel acetals, their production and their use as intermediates in synthesis.

The present invention provides benzyl cyano-acetals of the general Formula I, wherein Ar is a phenyl group optionally substituted with one or more of the substituents alkoxy, alkyl, halogen, and R is an alkyl group, preferably methyl or ethyl. In the above, the alkoxy and alkyl groups have from 1 to 4 carbon atoms.

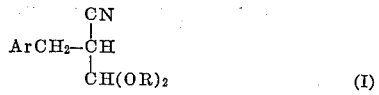
(I)

The compounds of Formula I are of value because, when reacted with guanidine they are converted to 2,4-diamino-5-benzylpyrimidines which have notable anti-bacterial properties. Further, this method of preparing 2,4-diamino-5-benzylpyrimidines gives superior yields to those obtained by the previously preferred route which is described in U.S. Pat. 3,049,544.

Other methods of preparing 2,4-diamino-5-benzylpyrimidines are disclosed in co-pending U.S. Pat. application 470,606 filed July 8, 1965 (now abandoned), assigned to the same assignees as this invention.

The acetals of Formula II are of particular interest, wherein R is defined as above, R' as an alkyl group, X and Y are alkoxy, halogen or hydrogen, and the alkoxy and alkyl groups have from 1 to 4 carbon atoms. This narrower group within the scope of Formula I is preferred because of the very high activity of the derived pyrimidines of Formula III (e.g., IIIa: X=OCH$_3$; R'=CH$_3$, Y=H. IIIb: X=Y=OCH$_3$; R'=CH$_3$).

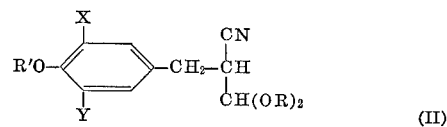
(II)

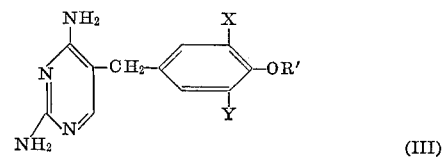
(III)

The compounds of Formula I are prepared by the following sequence:

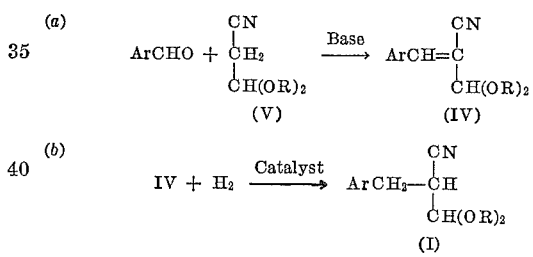

Alkoxides having from 1 to 4 carbon atoms are convenient and satisfactory for use as the base in step (a). Compound V, one of the starting materials of step (a), is conveniently prepared by the base-catalyzed addition of the elements of ROH to β-ethoxyacrylonitrile or to cyanoacetylene. Since this step is conveniently run in methanol or ethanol, R becomes the radical of the solvent alcohol. Further, since (RO)$_2$ is eliminated in the final reaction of I with guanidine, the exact identity of R is of little consequence. However, methyl acetals are more readily crystallized than the higher members and, on this ground, they are most advantageous.

The step (a) is conveniently conducted in a lower alcohol as solvent and, preferably, that alcohol is R'OH (since some exchange of R'O with solvent alcohol may take place). Since in R'OH the principal base present will be R'O$^-$, the reaction takes place under the influence of that substance, regardless of the actual source of the alkali. Thus, alkali could be introduced as NaH or NaNH$_2$, but in methanol as solvent, NaOCH$_3$ would be predominant after addition. Similarly, potassium metal could be dissolved in methanol to give a solution of KOH$_3$, R and R' are preferably lower alkyls having from 1 to 4 carbon atoms. The compounds V can be introduced as such, or they may be produced by the addition of the elements of solvent alcohol to β-ethoxy acrylonitrile (in which process exchange of alkoxyl groups also occurs).

$$C_2H_5-O-CH=CH-CN$$
$$\downarrow O\bar{C}H_3 \cdot HOCH_3$$
$$C_2H_5O-CH-CH_2-CN \xrightarrow{O\bar{C}H_3} CH_3O-CH=CH-CN$$
$$\phantom{C_2H_5O-CH-}\dot{O}CH_3 \phantom{-CN} \downarrow O\bar{C}H_3 \cdot HOCH_3$$
$$(CH_3O)_2-CH-CH_2-CN$$

The hydrogenation step (b) is conveniently carried out using a lower alcohol (e.g., methanol or ethanol) as solvent and employing a supported catalyst. Commercial palladized charcoal is satisfactory, as is platinized charcoal if suitably prepared. (See Baltzly, J. Amer. Chem. Soc., vol. 74, p. 4586 (1952).)

According to the present invention therefor, there are provided acetals of Formula I or Formula II, as hereinbefore defined.

According to the present invention in another aspect, there is provided a process for preparing acetals of Formula I or Formula II, which comprises the catalytic hydrogenation of an unsaturated acetal of Formula IV.

In another aspect, the present invention provides a process for preparing unsaturated acetals of Formula IV, which comprises the reaction of an aldehyde Ar CHO with a β,β-dialkoxypropionitrile of Formula V under alkaline conditions.

According to the present invention in a further aspect, there is provided a process for preparing benzylpyrimidines by reacting an acetal of Formula I or Formula II with guanidine.

The following examples illustrate the invention.

EXAMPLE 1

α-veratrylidene-β,β-dimethyoxy propionitrile

Sixteen g. (0.3 mole) of sodium methoxide was dissolved to a clear solution in 100 ml. of methanol. The solution was cooled and 11 g. (0.11 mole) of β-ethoxyacrylonitrile was added slowly with stirring. The solution was stirred at 40° C. for one-half hour and 16.6 g. (0.1 mole) of veratric aldehyde was then added. The aldehyde dissolved rapidly and the reaction mixture was stirred sixteen hours (over night) at 40–45° C. The methanol was then evaporated in vacuo and the residue was partitioned between ether and water, the aqueous layer being re-extracted with ether. The combined ethereal layers were washed with water, sodium bisulphite solution and again with water, and dried over magnesium sulphate. After filtration from the desiccant and evaporation of the solvent there remained a light yellow oil weighing 24 g.

EXAMPLE 2

α-veratryl-β,β-dimethoxy propionitrile

Twenty-one g. of the product from Example 1 was dissolved in a Parr Hydrogenator with 150 ml. of absolute ethanol and 2 g. of 5% palladized charcoal was added. After evacuation of the reducing chamber and admission of hydrogen, the reaction mixture was warmed to about 50° C. during reduction by means of an infrared lamp. After absorption of hydrogen had stopped, the catalyst was removed and the solvent evaporated in vacuo leaving 21 g. of a light-coloured oil. This material does not readily crystallize, but is free of aliphatic unsaturation and is pure enough for synthetic purposes.

EXAMPLE 3

2,4-diamino-5-(3′,4′-dimethoxy benzyl)pyrimidine

In two 175 ml. portions of absolute ethanol, were dissolved separately 62 g. of guanidine hydrochloride and 37 g. of sodium methoxide. The clear solutions were combined, cooled and filtered from the precipitated sodium chloride. To the resultant solution of guanidine in ethanol was added 59.5 g. of α-(3,4-dimethoxy benzyl [=veratryl])-β,β-dimethoxypropionitrile, prepared as in Example 2. The whole was refluxed sixteen hours on a steam bath and then concentrated to half-volume in vacuo and chilled in an ice-bath. The precipitated solid weighed 36 g. after filtration and washing with acetone followed by hexane. It was substantially pure 2,4-diamino-5-(veratryl)pyrimidine. By further concentration of the filtrate 4.5 g. more was obtained.

EXAMPLE 4

α-(3,4,5-trimethoxybenzylidene)-β,β-dimethoxypropionitrile

This experiment was conducted exactly after the pattern of Example 1, except that 19.6 g. (0.1 mole) of 3,4,5-trimethoxybenzaldehyde was used in place of veratric aldehyde. The product was a light yellow oil weighing 27 g. which solidified on standing. It can be recrystallized from aqueous methanol and then melts at 64–66° C.

EXAMPLE 5

α-(3,4,5-trimethoxybenzyl)-β,β-dimethoxypropionitrile

The product of Example 4 was hydrogenated by the method of Example 2. After reduction, the saturated product crystallized, M.P. 65.5–66.5° C. (best M.P. 68° C.).

EXAMPLE 6

2,4-diamino-5-(3′,4′,5′-trimethoxybenzyl)pyrimidine

This reaction was run exactly as described in Example 3, except 10 g. of the crystalline product of Example 5 was used and the guanidine solution was prepared from 10 g. of guanidine hydrochloride and 7 g. of sodium methoxide, each in 30 ml. of absolute ethanol. The pyrimidine product weighed 8 g. and melted at 196–198° C.

EXAMPLE 7

α-(3,4,5-trimethoxybenzylidene)-β,β-dimethoxypropionitrile

In another experiment conducted in the identical fashion of Example 4, 100 g. of trimethoxy benzaldehyde, 80 g. of sodium methylate, 56 g. of β-ethoxyacrylonitrile, and 0.5 liter of methanol were used. The product weighed 137 g.

EXAMPLE 8

α-[5-bromo-3,4-dimethoxybenzylidene]β,β-dimethoxypropionitrile

Sixteen grams of sodium methoxide was dissolved in 100 ml. of methanol. The solution was cooled to 40° C. and 11 g. of β-ethoxyacrylonitrile was added. The temperature was maintained at 40° with stirring for one-half hour and 24. 5 g. of 5-bromo-3,4-dimethoxybenzaldehyde was then added. After stirring at 40° C. for sixteen hours (over night) the solvent was removed in vacuo and the residue was partitioned between ether and water. The ethereal layer was washed twice with saturated sodium bisulfite solution and again twice with water and dried over magnesium sulphate. After charcoaling and evaporation of the ether the oily residue weighed 26.5 g.

EXAMPLE 9

2,4-diamino-5-[5′-bromo-3,4-dimethoxybenzyl]pyrimidine

Five grams of the unsaturated nitrile from Example 7 was hydrogenated by the method of Example 2 and the oily product (5 grams) was reacted with guanidine (from 6 g. of guanidine hydrochloride and 4 g. of sodium methoxide in 60 ml. of abs. ethanol) as described in Example 3. The product after crystallization from alcohol melted at 200–203.5° and showed no depression of melting point when mixed with an authentic sample.

EXAMPLE 10

α-[p-chlorobenzylidene]-β,β-dimethoxypropionitrile

Fourteen grams (0.1 mole) of p-chlorobenzaldehyde was condensed with the reaction mixture from 11 g. of β-ethoxyacrylonitrile and 16 g. of sodium methoxide in 100 ml. of methanol as described in Example 1. The oily product weighed 20 g.

EXAMPLE 11

2,4-diamino-5-[p-chlorobenzyl]-pyrimidine

The unsaturated nitrile above was hydrogenated by the method of Example 2 and the oily product was reacted with guanidine as described in Example 3. The product melted at 215–216° and at 216–217° when mixed with an authentic sample.

What is claimed is:

1. A method of preparing a compound of Formula a

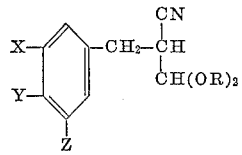

(a)

which comprises the steps of
(1) mixing a compound of the Formula b

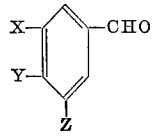

(b)

with a compound of the Formula c

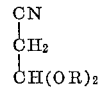

(c)

in the presence of lower alkanol and an alkali base and then maintaining the mixture at an elevated temperature to form a compound of the Formula d

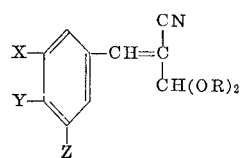

(d)

and (2) treating a solution of the compound of Formula d with hydrogen in a lower alcohol solvent in the presence of a palladized charcoal catalyst or a platinized charcoal catalyst to form a compound of Formula a, in the above Formulas X, Y and Z are selected from the class consisting of hydrogen, lower alkoxy and halogen and R is lower alkyl.

2. A method according to claim 1 in which R is methyl or ethyl.

3. A method according to claim 1 in which the solvent is methanol or ethanol.

4. A method according to claim 1 in which X, Y and Z are lower alkoxy or hydrogen and R is lower alkyl having 1 to 4 carbon atoms.

5. A method according to claim 1 wherein Z is hydrogen, X and Y are methoxy and R is methyl.

6. A method according to claim 1 in which X, Y and Z are methoxy and R is methyl.

7. A method according to claim 1 in which the solvent is methanol.

8. A method according to claim 1 in which the solvent is ethanol.

References Cited

UNITED STATES PATENTS

| | | | |
|---|---|---|---|
| 2,745,866 | 5/1956 | Rorig | 260—465 |
| 2,951,089 | 8/1960 | Ginsberg et al. | 260—465 |
| 3,049,544 | 8/1962 | Stenbuck et al. | 260—256.4 |
| 3,128,300 | 4/1964 | Miller et al. | 260—465 |
| 3,341,541 | 9/1967 | Hoffer | 260—256.4 |

OTHER REFERENCES

Baltzly, J. Am. Chem. Soc., vol. 74 (1952), pp. 4586–9.

ALEX MAZEL, Primary Examiner

R. J. GALLAGHER, Assistant Examiner

U.S. Cl. X.R.

260—256.4; 465.6, 999